United States Patent
Cao et al.

(10) Patent No.: US 6,888,797 B1
(45) Date of Patent: May 3, 2005

(54) HASHING-BASED NETWORK LOAD BALANCING

(75) Inventors: Zhirou Cao, Atlanta, GA (US); Zheng Wang, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/536,338

(22) Filed: Mar. 25, 2000

Related U.S. Application Data

(60) Provisional application No. 60/132,574, filed on May 5, 1999.

(51) Int. Cl.$^7$ .................................................. H04J 3/14
(52) U.S. Cl. .................. 370/235; 370/253; 370/352; 370/392; 370/401; 455/453; 713/153; 713/162
(58) Field of Search .................. 370/235, 253, 370/352, 389, 392, 401, 218, 349, 395.32, 237, 238, 390, 402, 232; 455/453; 709/105; 713/153, 162

(56) References Cited

U.S. PATENT DOCUMENTS 5,978,951 A * 11/1999 Lawler et al. ............... 714/758
6,496,928 B1 * 12/2002 Deo et al. .................... 713/153

* cited by examiner

*Primary Examiner*—Dang Ton
*Assistant Examiner*—Inder Pal Mehra

(57) ABSTRACT

A hashing-based router and method for network load balancing includes calculating a hash value from header data of incoming data packets and routing incoming packets based on the calculated hash values to permissible output links in desired loading proportions.

19 Claims, 3 Drawing Sheets

HASHING-BASED NETWORK LOAD BALANCING

RELATED APPLICATION

This application claims priority under Provisional Application No. 60/132,574, filed May 5, 1999.

BACKGROUND OF THE INVENTION

This invention relates to network load balancing. More particularly, this invention relates to a system and a method for table-based hashing for traffic splitting in order to achieve network load balancing.

Load balancing, also known as load sharing, is a basic technique that has been used in networks, for example the Internet, for enhancing network performance and reliability. A typical simple load balancing system has a traffic splitter, an incoming link, and two or more outgoing links. The traffic splitter takes data packets from the incoming traffic link and dispatches the packets onto one of the outgoing links. The traffic to the outgoing links is split into specific proportions.

Many large enterprise networks are connected to multiple Internet Service Providers (ISPs), often referred to as multihomed. Multiple paths to Internet backbones provide redundant connectivity and the potential to distribute traffic loading effectively and thereby reduce congestion. To achieve high availability, many of the Internet backbones are engineered to have multiple parallel trunks between major points of presence (PoPs). Typically, those parallel trunks are all in service rather than as hot standby so that the utilization during the normal operation can be substantially reduced. Most routing protocols, have mechanisms to allow traffic to be split over multiple equal-cost paths.

The advent of Wavelength Division Multiplexing (WDM) has significantly increased the use of load balancing. WDM expands the capacity of communication trunks by allowing a greater number of channel to be carried on a single optical fiber. With potentially tens or even hundreds of parallel channels between major PoPs, effective load balancing is essential if one is to utilize the expanded capacity efficiently.

With the exponential growth in Internet traffic, parallel architectures offer a scaleable approach for packet processing in routers. Instead of going through a central processing engine, packets can be dispatched to multiple processing engines inside a router to increase the overall processing throughput. The same technique can also apply to Internet servers such as web servers. A router may split the traffic to different ports that are connected to different web servers.

Key to good load balancing is the method that dispatches packets from a traffic stream onto multiple smaller streams. The traffic splitting method determines the efficiency of the load balancing and also the complexity in implementing load balancing in routers.

Inverse multiplexing is a special form of the load balancing that has been extensively studied and widely used in telecommunication networks. Inverse multiplexing allows telecommunications service providers to offer wideband channels by combining multiple narrowband trunks. Inverse multiplexers which operate on 56 kpbs and 64 kbps circuit switched channels are commercially available. Standardization of inverse multiplexers has been started by the BONDING consortium, described in P. Fredette, The Past, Present and Future of Inverse Multiplexing, IEEE Network, April 1995.

Most inverse multiplexing schemes use some form of round robin, or fair queuing, methods to split traffic. Each successive packet is routed according to the round robin protocol, which can lead to packets of a given connection being sent out over different outgoing links. This, however leads to likely misordering of packets at the receiving end because different paths have different delays. In order to maintain synchronization, it is necessary to add extra packet header with sequence numbers or to keep state at each end of the inverse multiplexed channel. Therefore, inverse multiplexing typically operates at data link layer over point-to-point links. Sometimes it is incorporated into a data link layer protocol. For example, Point-to-Point Protocol (PPP) has extended its packet formats to allow inverse multiplexing to be implemented although no algorithm is specified how the inverse multiplexing is performed at either the sending or the receiving side. The misordering of packets triggers a false TCP congestion adjustment, which unnecessarily reduces throughput.

Hashing-based schemes for load balancing have been used in some commercial router products. However, the methods in these products are very simple, typically using the last 2–3 bits of the Internet Protocol (IP) destination address or simple hashing over the IP destination address to distribute traffic over multiple links.

OSPF (Open Shortest Path First) routing protocol has incorporated support for multiple equal-cost paths. However, the algorithms for splitting traffic over multipaths are not specified there. In the OSPF Optimized Multipath protocol (OSPF-OMP), described by Villamizer in "OSPF Optimized Multipath (OSPF-OMP)", working draft, March 1998, a number of possible approaches for load balancing over multiple paths have been proposed, including per-packet round robin, dividing destination prefixes among available next hops in the forwarding table, and dividing traffic according to a hash function applied to the source and destination pair. However, the actual hash functions for traffic splitting is not defined.

A traffic splitting scheme using random numbers was proposed in D. Thaler, "Multipath Issues in the Unicast and Multicast", working draft, January 1997. In the scheme, each next-hop is assigned with a weight based on a simple pseudo-random number function seeded with the flow identifier and the next-hop identifier. When a packet arrived and there are N next hops for the destination, the weights are calculated and the next-hop receiving the highest weight is used for forwarding. The scheme is approximately N times as expensive as a hashing-based scheme. Also, no performance studies on the proposed scheme were offered.

What is needed is a fast acting method for network load balancing that distributes traffic over multiple links without misordering of packets, at whatever load proportion that is desired.

SUMMARY OF THE INVENTION

Deficiencies in the prior art are overcome, and an advance in the art is achieved with a system and method for hashing-based network load balancing that offers control over loads offered to output links. The method includes calculating a hash value from header data located within incoming data packets and routing incoming packets based on the calculated hash values to obtain a desired loading of output links.

DETAILED DESCRIPTION

Figure 1:
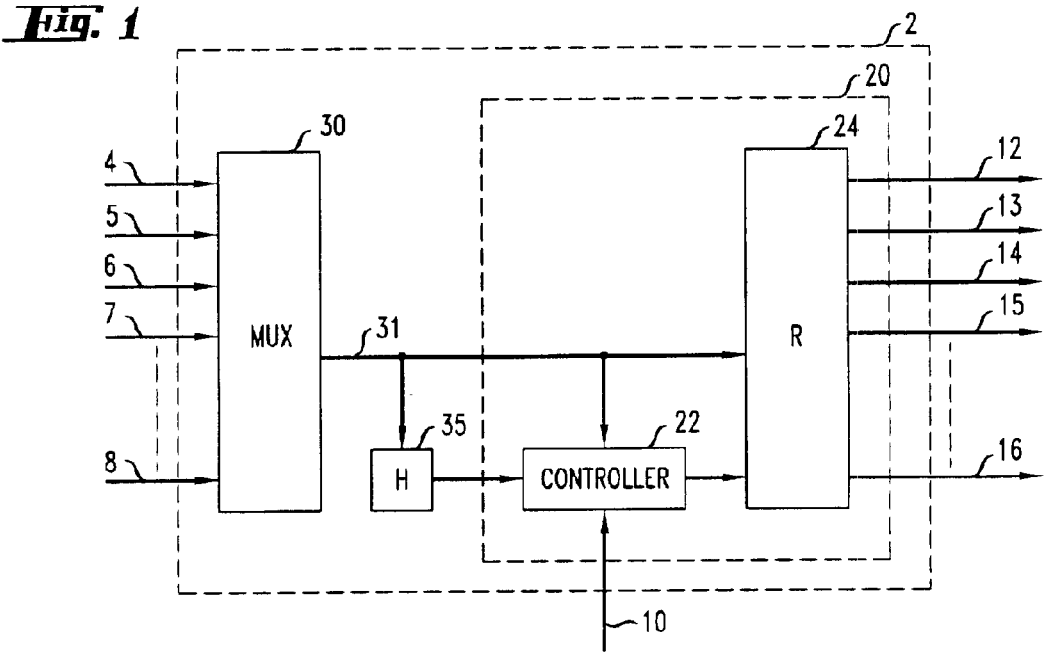
FIG. 1 presents a block diagram of a system in accord with the principals disclosed herein.

FIG. 1 presents a diagram of an illustrative arrangement that embodies the principals described herein. System 2 is a router with incoming links 4–8 and outgoing links 12–16. Each input link can be handled separately with respect to where packets that arrive on the input link are routed, or the packets of input links 4–8 can be effectively multiplexed and handled as a single stream of packets that are to be routed to output links 12–16. For purposes of this disclosure, while it matters not how system 2 is actually embodied, the principles disclosed herein are simpler to understand when the input is handled as a single stream and, therefore, the following assumes that input links 4–8 are applied to a multiplexer 30, yielding a single stream of incoming packets on line 31. Line 31 is coupled to hash circuit 35, and to routing element 20. Element 20 includes a controller 22 that is responsive to control signals arriving on line 10 and, of course, to the destination information contained within the headers of incoming packets of line 31; and a routing unit 24 that is connected to line 31, to controller 22, and to output links 12–16.

Hashing circuit 35 obtains a hash value derived from selected information in the header of incoming packets. The information pertains to the source address field, source port field, destination address field, destination port field, and the protocol ID field. The selected information can be an entire field, a segment of a field, or a number of segments of a field. Any of a variety of hashing functions can be employed, and the simple $x=K_{modulo\ M}$ is illustratively employed herein, where K is a number related to the selected information, and M is a predetermined value. Hashing circuit 35 is illustrative of circuits that map many different inputs to a few outputs, where the probability of given a random input being mapped to any particular output is substantially the same as that of being mapped to any other output. Hashing circuit 35 is illustrative of a many-to-few mapper, and the function that it executes is illustrative of many-to-few mapping functions. Although M can have any chosen value, as will be appreciated from the exposition below, a larger value of M provides for finer granularity in the control of the load distribution on outgoing links.

Figure 2:
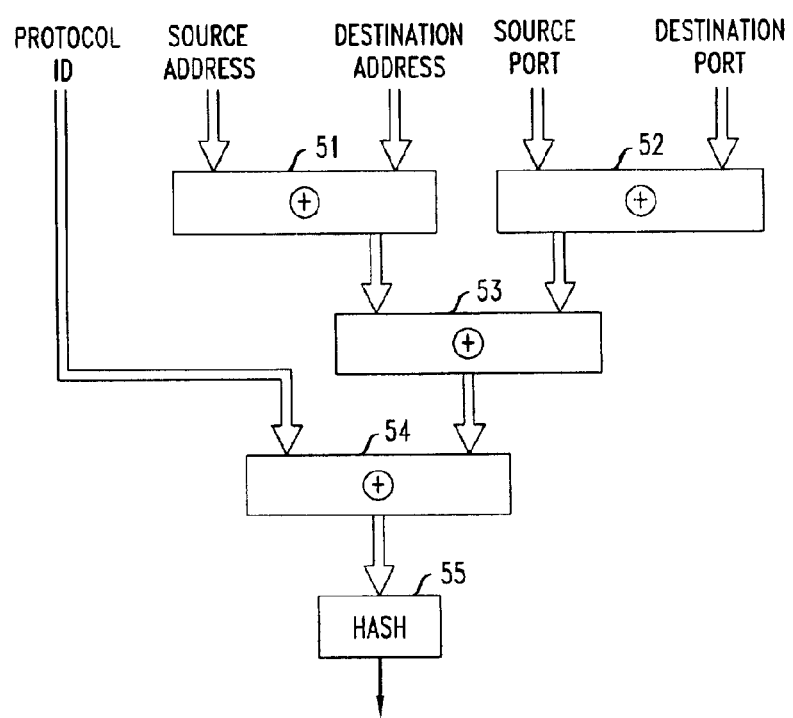
FIG. 2 illustrates one approach for developing a hash value.

FIG. 2 depicts one illustrative hashing function that employs all five of the above-mentioned fields. With a hashing function of the form $x=K_{modulo\ M}$ it is important to combine the fields prior to the application of the modulus function. Accordingly, FIG. 2 includes Exclusive OR elements 51, 52, 53, and 54 that are arranged to form the a field that corresponds to $$K=\text{Protocol-ID} \oplus \text{Source} \oplus \text{Source-Port} \oplus \text{Destination} \oplus \text{Destination-Port}.$$

The number that is represented by the developed field K is applied to modulus circuit 55, which yields $x=K_{modulo\ M}$. It should be appreciated that the modulus, M, in the FIG. 2 arrangement might, advantageously, be selected to be between $2^N-1$ and $2^{N-1}$, where N is the number of bits at the output of circuit 54. An M that is larger $2^N-1$ would result is some numbers never being developed by circuit 55, and an M that is smaller than $2^{N-1}$ will affect the frequency distribution of the numbers developed by circuit 55.

Figure 3:
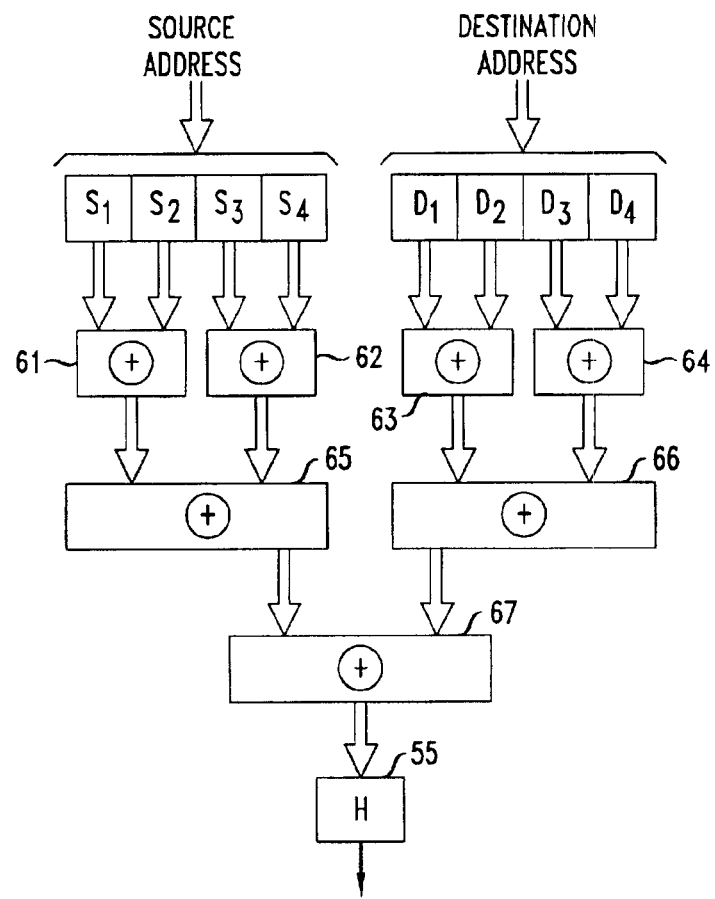
FIG. 3 illustrates another approach for developing a hash value.

FIG. 3 illustrates another embodiment for hashing circuit 35 that is adapted for smaller values of M, and happens to employ only the destination and source addresses. In FIG. 3, the destination address is divided into four segments $D_{s1}$, $D_{s2}$, $D_{s3}$, and $D_{s4}$. Similarly, the source address is divided into four segments $S_{s1}$, $S_{s2}$, $S_{s3}$, and $S_{s4}$. Having divided the destination and source addresses, Exclusive OR elements 61–67 are interconnected and coupled to the created segments to form $$K=D_{s1} \oplus D_{s2} \oplus D_{s3} \oplus D_{s4} \oplus S_{s1} \oplus S_{s2} \oplus S_{s3} \oplus S_{s4}$$

As in FIG. 2, the K is applied to modulus circuit 55 to develop the hash value x.

Figure 4:
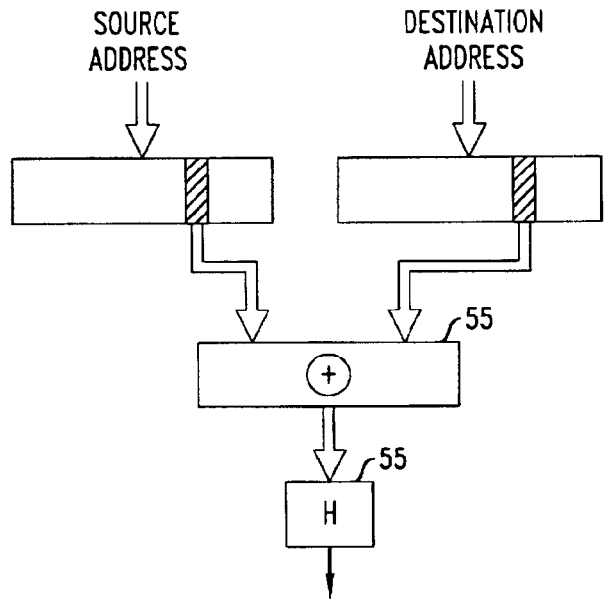
FIG. 4 illustrates yet another approach for developing a hash value.

FIG. 4 illustrates still another embodiment of hash circuit 35. It simply takes a selected segment from the destination address, and a selected segment from the protocol ID, performs and Exclusive OR of the selected segments with element 68, and applies the result to modulus circuit 55.

for a selected collection of fields in the header of incoming packets. In accordance with the principles of this invention, the selected fields are at least a part of the destination field, and one or more.

One function of controller 22, which is a conventional function, is to observe the destination address of a packet and to decide which output port to employ. This can be accomplished with a simple look-up table that is populated with information provided to controller 22 via line 10. In connection with some destinations, controller 22 is offered the flexibility to output packets on any one of a number of output ports. The collection of output ports that can be employed may be as small as two output ports, and theoretically as large as the number of output ports that switch 2 has.

In accordance with the principles disclosed herein, in connection with destinations where switch 2 has the flexibility to route packets to a plurality of output ports, the loading distribution can be adjusted, based on the developed hash values of the affected packets, with a granularity that is proportional to the value of M. Larger M values provide for finer granularity. For example, with M=100, a 1% granularity is provided.

Figure 5:
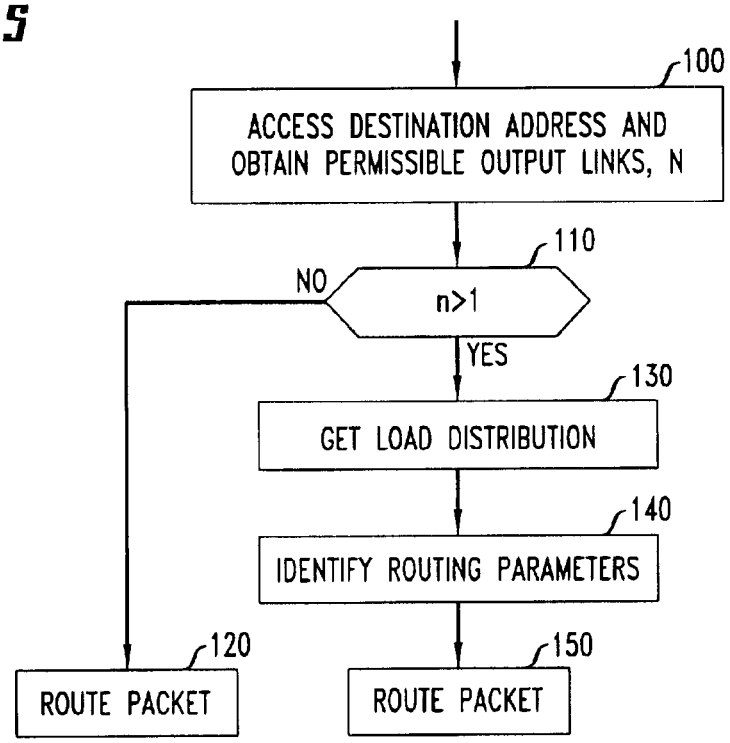
FIG. 5 presents a flowchart of a process executed in controller 22.

In effecting the loading on output links, controller 22 can follow a process akin to the one shown in the flow chart of FIG. 5. Step 100 assesses the destination address of the packet and accesses a table within control 22 that identifies the permissible output links to which the packet can be routed. Control then passes to step 110 where it is ascertained whether the number of permissible output links is greater than 1. When that is not the case, control passes to step 120, where the packet is routed to the only permissible output link. When step 110 determines that there are a number of permissible output links, control passes to step 130, which obtains a load distribution for the permissible output links. The specific method used to obtain the load distribution does not form a part of this invention. For illustration purposes, however, it may follow the algorithm of identifying the percentage load of each of the permissible links and concluding that the load ratio should follow those percentages. For example, if there are three permissible output links, $OL_1$, $OL_2$, and $OL_3$, with loads 50%, 35%, and 90%, the loading distribution might be set at (100-50) to (100-35), to (100-90), or 50:65:10, or $$\frac{50}{125}, \frac{65}{125}, \frac{10}{125}.$$

Following step 130, control passes to step 140, which selects output links based on the load distribution identified in step 130, and on the hash values. The dependence on hash values can be implemented with the aid of a table that links hash values to output links. Alternatively, the dependence can be computed "on the fly" based on the load distribution obtained in step 130. For the illustrative example presented above, if M happens to be set at 125 then, correspondingly, step 140 sets up thresholds at 49 and 114, and passes control to step 150. Step 150 executes the actual routing with the simple "select" statement based on the hash value, x:

```
Select case x
    Case <50
        Route packet to OL₁
    Case >49 and <115
        Route packet to OL₂
    Case >115
        Route packet to OL₂
End select
```

The FIG. 1 embodiment is depicted with a hardware hash circuit 35 that is separate from controller 22. Of course, hash circuit 35 can be incorporated within controller 22, and when controller 22 is embodied in a stored program controller processor, the functionality of circuit 35 can be implemented in the software within controller 22.

Figure 6:
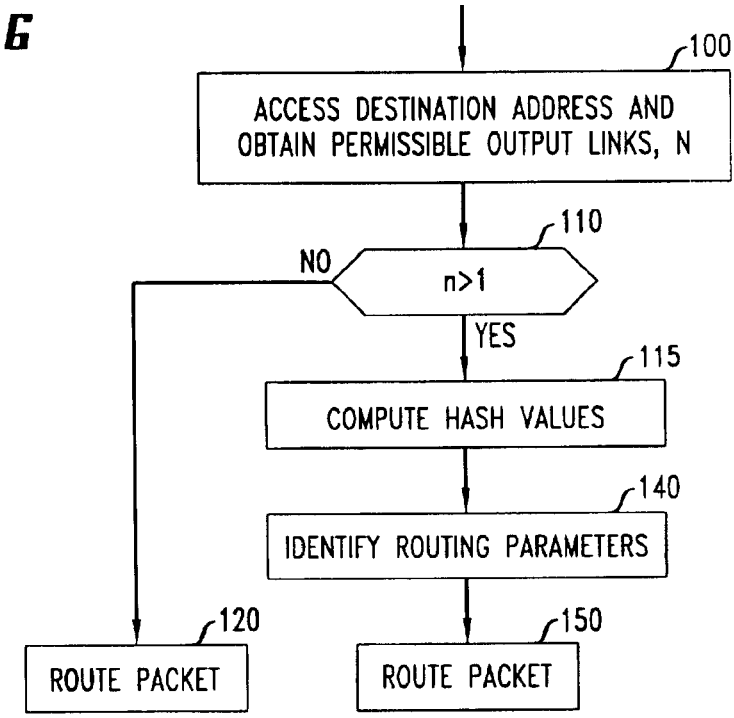
FIG. 6 presents an alternate flowchart of the process executed in controller 22.

It should also be realized that embodiments that are somewhat different from the embodiment described in FIG. 1 are possible that nevertheless incorporate the principles of this invention. For example, the FIG. 1 embodiment computes the hash value of all incoming packets. An alternative embodiment computes the hash values of only packets for which the controller has flexibility in routing. In such an embodiment, the process followed by controller 22 may be as shown in FIG. 6. The FIG. 6 process is identical to the FIG. 5 process, except that the process includes a step 115 that is interposed between steps 110 and 130. Step 115 computes hash values, as described above.

What is claimed is:

1. A method of traffic splitting of incoming data for network load balancing comprising the steps of:
    calculating the value from entirety of header data located within the incoming data by use of a hash function $x = K_{modulo\ M}$, where x is said value, M is a preselected modulus value, and K is related to said header data;
    determining, in accord with a predetermined algorithm, an output link based on the value and on network load directions; and
    coupling the incoming data to the outgoing link.

2. The method of claim 1 wherein the value is determined from a hash function.

3. The method of claim 1 where said header data comprises information from said destination field and data from at least on of the following: protocol ID, destination port, source address, and source port.

4. The method of claim 1 where said header data comprises data from a protocol ID, a source address, a destination address, a source port, or a destination port.

5. The method of claim 3 where K is obtained by combining selected fields in said header data with an Exclusive OR function.

6. The method of claim 5 where said selected fields are a protocol ID, a source address, a destination address, a source port, and a destination port.

7. The method of claim 5 where said selected fields are a destination field and at least one of the following fields: protocol ID, destination port, source address, and source port.

8. The method of claim 5 where said selected fields are at least one section of a destination field and data from at least one of the following fields: on or more sections of a protocol ID, one or more sections of a destination port, one or more sections of a source address, one or more sections of a source port, and other sections of said destination field.

9. The method of claim 5 where said selected fields are one or more segments, but less entirety, of a source address and one or more segments, but less entirety, of a destination address.

10. The method of claim 1 where said step of determining an output link is effected through a look-up table.

11. The method of claim 1 where said step of determining an output link is effected through comparing said value to thresholds.

12. The method of claim 1 where said network loading directions are specified.

13. The method of claim 1 where said network loading directions are supplied pursuant to network load conditions.

14. A router including input links for receiving incoming packets, a routing element for directing incoming packets to outgoing links, and a controller, the improvement comprising:
    a many-to-few mapping element for obtaining a value from data contained in headers of incoming packets, applying said value to said controller, and
    said controller modified to be responsive to said value and to desired loading of said outgoing links, and to route incoming packets that may be routed to any of a plurality of output links in accordance with said value and said desired loading of said output links.

15. The router of claim 14 wherein said data comprises destination address of incoming packets combined with at least a portion of one or more from the following: protocol ID, source port, destination address, and destination port.

16. The router of claim 15 where said many-to-few mapping elements computes a hash value from said data.

17. The router of claim 16 where said controller is modified to include a modulo that routes packets based on results of an evaluation of relationship of said value and output links, which evaluation embodies desired network loading.

18. The router of claim 16 where said controller is modified to include a modulo that routes packets based on results of an evaluation of relationship of said value to thresholds.

19. The router of claim 16 where said thresholds are set by desired network loading.

* * * * *